United States Patent [19]

Shiraki et al.

[11] Patent Number: 5,151,975
[45] Date of Patent: Sep. 29, 1992

[54] WORD PROCESSOR WITH TEXT LAYOUT DISPLAY FUNCTION

[75] Inventors: Tatsuya Shiraki, Nara; Makoto Kado, Yamatokoriyama, both of Japan

[73] Assignee: Sharp Kabushiki Kaisha, Osaka, Japan

[21] Appl. No.: 750,770

[22] Filed: Aug. 22, 1991

Related U.S. Application Data

[63] Continuation of Ser. No. 409,424, Sep. 19, 1989, abandoned.

[30] Foreign Application Priority Data

Sep. 30, 1988 [JP] Japan ............................... 63-247748

[51] Int. Cl.5 .......................... G06F 3/14; G06F 3/153
[52] U.S. Cl. ........................................ 395/153; 395/148
[58] Field of Search ................. 364/518, 521, 523; 395/144–146, 148, 153

[56] References Cited

U.S. PATENT DOCUMENTS

| 4,663,615 | 5/1987 | Hernandez et al. | 340/723 |
|---|---|---|---|
| 4,686,649 | 8/1987 | Rush et al. | 364/521 |
| 4,710,885 | 12/1987 | Litteken | 364/518 |
| 4,755,955 | 7/1988 | Kimura et al. | 364/521 X |
| 4,860,372 | 8/1989 | Kuzunuki et al. | 340/708 |
| 4,881,197 | 11/1989 | Fischer | 364/900 |
| 4,891,770 | 1/1990 | Hollett | 364/518 X |

OTHER PUBLICATIONS

*Using Microsoft WORD*, Vers. 3.0, Microsoft Corp. pp. xxi, 51–70 and 293–318.

*Primary Examiner*—Gary V. Harkcom
*Assistant Examiner*—Michael A. Jaffe
*Attorney, Agent, or Firm*—Cohen, Pontani, Lieberman & Pavane

[57] ABSTRACT

A word processor with a text layout display function, arranged so as to confirm various input conditions from the information in a text frame which is displayed concurrently on the same screen. The word processor has a storage unit for storing various kinds of text frames, a readout unit for reading out one text frame from the storage unit, a display unit capable of forming an input region and/or text frame display region, a display control unit for concurrently displaying the words in the input region and the text frame in the text frame display region respectively, a converting unit for converting words into symbols which have been inputted on a character by character basis, and a symbol output unit for displaying the converted symbols in the text frame.

4 Claims, 14 Drawing Sheets

FIG. 3

| CHARACTER CODE |
|---|
| " |
| " |
| --- |
| " |
| --- |

| FRAME NUMBER | SIZE | DATA REGION | FORMAT ATTRIBUTE | ATTRIBUTE |
|---|---|---|---|---|
| 1 | 100mm × 100mm | A1~A2 | 1 | 10 LINES · 10 CHARACTERS |
| --- | --- | --- | --- | --- |

42
Ⓐ

ATTRIBUTE

1 : Text, Attribute
2 : Image, Attribute
3 : Graph, Attribute
4 : Input Prohibition

A4 · LONGITUDINAL ENTRY　　(PAGE 1)

LEFT MARGIN 27 mm

LATERAL WRITING

TEXT FRAME A
CURSOR
DELIMITER

| | |
|---|---|
| FORMAT | : SET THE PRINTING DIRECTION |
| SHIFT | : SHIFT THE DELIMITER |
| LONGITUDINAL DELIMITER | : DELIMITING IN THE LONGITUDINAL DIRECTION |
| LATERAL DELIMITER | : DELIMITING IN THE LATERAL DIRECTION |
| PREVIOUS PAGE | : RETURN TO THE PREVIOUS PAGE |
| NEXT PAGE | : MOVE TO THE NEXT PAGE |

FIG. 5(b)

(PAGE 1)

A4 · LONGITUDINAL ENTRY

LEFT MARGIN 27mm

LATERAL WRITING

FORMAT : SET THE PRINTING DIRECTION
SHIFT : SHIFT THE DELIMITER
LONGITUDINAL DELIMITER : DELIMITING IN THE LONGITUDINAL DIRECTION
LATERAL DELIMITER : DELIMITING IN THE LATERAL DIRECTION
PREVIOUS PAGE : RETURN TO THE PREVIOUS PAGE
NEXT PAGE : MOVE TO THE NEXT PAGE

FIG. 5(c)

(PAGE 1)

A4 · LONGITUDINAL ENTRY

LEFT MARGIN 27mm

LATERAL WRITING

FORMAT : SET THE PRINTING DIRECTION
SHIFT : SHIFT THE DELIMITER
LONGITUDINAL DELIMITER : DELIMITING IN THE LONGITUDINAL DIRECTION
LATERAL DELIMITER : DELIMITING IN THE LATERAL DIRECTION
PREVIOUS PAGE : RETURN TO THE PREVIOUS PAGE
NEXT PAGE : MOVE TO THE NEXT PAGE

FORMAT DISPLAY REGION (PAGE 1)

A4 · LONGITUDINAL ENTRY

LEFT MARGIN  27 mm

JAPANESE CHARACTER
NUMBER : 19 CHARACTERS    LATERAL WRITING

LINE FEED : 7.0 mm
CHARACTER SPACE : 4 DOTS

POINT NUMBER  10.5 P

(FRAME SETTING)

FORMAT          : SET THE LINE FEED PITCH
INPUT PROHIBITING FRAME : PROHIBIT THE INPUT
IMAGE FRAME     : INPUT THE IMAGE
GRAPH FRAME     : INPUT THE GRAPH
FRAME RELEASE   : RELEASE FRAME SETTING

IMAGE FRAME

INPUT PROHIBITING FRAME

GRAPH FRAME

| CHANGE-OVER | FORMAT | INPUT PROHIBITING FRAME | | END | IMAGE FRAME | GRAPH FRAME | | FRAME RELEASE | ALL IS KANA |

PICTURE KEY

FIG. 7(b)

FORMAT DISPLAY REGION (PAGE 1)

A4・LONGITUDINAL ENTRY

LEFT MARGIN 27 mm

JAPANESE CHARACTER
NUMBER : 19 CHARACTERS   LATERAL WRITING

LINE FEED   7.0 mm
CHARACTER SPACE : 4 DOTS

POINT NUMBER 10.5 P (FRAME SETTING)

FORMAT           : SET THE LINE FEED PITCH
INPUT PROHIBITING FRAME : PROHIBIT THE INPUT
IMAGE FRAME      : INPUT THE IMAGE
GRAPH FRAME      : INPUT THE GRAPH
FRAME RELEASE    : RELEASE FRAME SETTING

IMAGE FRAME : 
INPUT PROHIBITING FRAME : 
GRAPH FRAME :

| CHANGE OVER | FORMAT | INPUT PROHIBITING FRAME | END | IMAGE FRAME | GRAPH FRAME | | FRAME RELEASE | ALL IS KANA |

PICTURE KEY

WORD PROCESSOR WITH TEXT LAYOUT DISPLAY FUNCTION

This is a continuation of U.S. application Ser. No. 07/409,424, filed Sep. 19, 1989 now abandoned.

BACKGROUND OF THE INVENTION

1. Field of the Invention

The present invention generally pertains to a word processor, and more particularly, to a word processor having the function of displaying a layout of text.

2. Description of the Prior Art

One typical arrangement of a word processor is that when character data is inputted from a keyboard, words corresponding to the thus inputted character data are read from a dictionary unit and displayed on a display unit. The display unit displays the words, wherein a part of input-allowable paper size generally serves as the input region because of its dimensional limitations. Under such circumstances, there are currently available word processors having functions to scale-down the display layout of the overall text and to affirm a particular input position in the text on another screen. When confirming the layout of text by utilizing this type of word processor, it is possible to display a format in which the text is inputted to a 1-page space by selecting a function which changes the screen to a text layout display screen. A word processor invested with such a frame edit function is arranged so that a text frame is partitioned into a plurality of regions, and attributes such as character input and graphic image input can be set in each region.

The above-described frame edit function is intended to effect editing operations in one block units defined by a given range within the input region.

Disclosed in Japanese Laid-Open Patent No. SHO 57(1982)-60380, titled "WORD PROCESSOR", is a word processor comprising a means for setting a frame conceived as a character input region and a means for processing the characters within the input region set by the setting means. This word processor does not possess the function which allows display, on the same screen, of the ultimate layout of text (as it will appear on paper after printing) at the same time as text is input from the keyboard to the screen.

In Japanese Laid-Open Patent No. SHO 56(1981)-103762, titled "LISTING SYSTEM", there is disclosed a listing system for properly arraying the input characters in a plurality of regions partitioned lengthwise and crosswise by ruled lines. In describing this listing system, however, there is no mentioned of a system for displaying newly-inputted text and a layout thereof on the same screen simultaneously.

The following problems are inherent in the foregoing word processing systems.

(1) The input screen must be changed to the layout display screen when confirming the layout of text in the midst of input, and hence it is impossible to confirm the text layout while inputting the text as well as the degree to which a character string is inputted within the text layout on the same screen.

(2) If a text frame defined as an outer frame of the text layout is split into a plurality of regions, it is impossible to affirm both a specific region, within the text frame, to which the newly-inputted characters and images correspond, and the specific number of sentences that are being inputted to the divided frame regions, respectively.

(3) When setting different kinds of attributes (a character input, an image input, a graphic input and input prohibition) in the divided frame regions, the attributes have to be set by individually selecting the frame regions. Hence, much labor is required for setting the attributes.

(4) When confirming the attributes set in the respective frame regions, each frame region has to be called and examined separately. A good deal of labor is therefore needed for confirming the attributes.

(5) Where the text frame is split into a plurality of regions, and if character strings inputted to a single frame region are in excess of this frame region, the excessive character strings are automatically fed to the next predetermined frame region (a region to which the characters can be inputted). As a result, it is not possible to select an input destination, which involves the steps of, for instance, effecting a format change for the excessive character strings and re-inputting them to the frame region in the midst of input.

SUMMARY OF THE INVENTION

It is a primary object of the present invention to provide a word processor with a text layout display function, comprising: input means for entering text data and inputting sets of instructions to read out a text frame; dictionary means for storing a multiplicity of words; readout means for reading out the word from the dictionary means in response to the text data entered by the input means; text frame storage means for storing several kinds of text frames; format storage means for storing text formats displayed within the frames; text frame readout means for reading out a single text frame from the text frame storage means in response to said instruction from the input means; display means capable of forming an input region and/or text frame display region on a single screen; display control means for concurrently displaying the words read out by the readout means in the input region and the text frame read out by the text frame readout means in the text frame display region, respectively; cursor display means for displaying a cursor within the input region; symbol converting means for sequentially converting the words read out by the readout means into symbols on a character by character basis; and symbol output means for displaying the converted symbols within the text frame in conformity with the format stored in the format storage means.

A) The word processor according to the present invention further comprises: dividing means for dividing the text frame into a plurality of frame regions; frame region selecting means for selecting any one of the frame regions which has been divided by the dividing means; second cursor display means for displaying a second cursor within the frame region, corresponding to the cursor within the input region displayed by the cursor display means; and input region identifying means for identifying and displaying the frame region corresponding to the input region.

B) The word processor according to the present invention, when the text frame is arranged so that it can be divided into a plurality of frame regions, further comprises: attribute setting means for setting attributes of the frame region selected by the frame region selecting means; attribute storage means for storing the attributes while making the set attributes correspond to the selected frame region; input means for entering image data; and allocating means for allocating text data and image data, which are to be inputted to the frame region, to character processing or image processing with reference to the attribute storage means.

C) The word processor according to the present invention, when the text frame is arranged so that it can be divided into a plurality of frame regions in which attributes are set, further comprises: pattern storage means for storing the various kinds of patterns corresponding to their attributes; and pattern allocating means for allocating the patterns corresponding to the attributes to the individual frame regions within the text frame after reading out the patterns from the pattern storage means for every frame region when the attributes of the respective frame regions are set by the attribute setting means.

D) The word processor according to the present invention, when the text frame is arranged so that it can be divided into a plurality of frame regions, further comprises: judging means for judging whether or not the words read out from the dictionary means exceed the number of lines which can be inputted in the selected frame region; and input destination specifying means for specifying an input destination of the words read out which exceed the number of the input enable lines when judging that the words exceed the number of input enable lines allowed in that region.

One or more of the foregoing constructions A) - D) may be added to the word processor with a text layout display function according to the present invention.

The attributes used in the present invention imply processing modes set in the frame regions, and more specifically include such modes as character input, an image input, graphic input and input prohibition.

Based on the construction of the invention, the input region and the text frame are displayed on the same screen, and the text displayed in the input region is also displayed in the form of symbol strings in the text frame. With this arrangement, the sentences can be inputted while confirming the layout of the text, and the amount of inputted sentences can be confirmed by the amount of the symbol strings.

Where the construction A) is added to the invention, the text frame can be split into a plurality of frame regions, and any one of the divided frame regions can be selected. In addition, a cursor position in the input region can be affirmed by means of a second cursor displayed in the frame region, and further the simultaneous input of characters to the region can be recognized within a text layout.

Where the construction B) is added to the invention, a selected frame region and attributes set in this frame region are stored in the attribute storage means, thereby making it possible to set different kinds of attributes in the various frame regions without changing the screen.

Where the construction C) is added to the invention, patterns corresponding to the set attributes of the divided frame regions are read out from the pattern storage means and allocated to particular frame regions. As a result, it is feasible to affirm the attributes set in the individual frame regions at a glance from the allocated patterns without changing the screen.

Where the construction D) is added to the invention, there must be a wait for an instruction associated with an input destination of the excessive words, if the words are read out in excess of a range of the input region corresponding to the divided frame region. With this arrangement, a degree of freedom for which the text can be created is improved.

DESCRIPTION OF THE DRAWINGS

An embodiment of the invention will now be described by way of example and with reference to the accompanying drawings, in which:

FIGS. 1 through 9 in combination show one embodiment of a word processor according to the present invention.

DESCRIPTION OF THE PREFERRED EMBODIMENT

Figure 1:
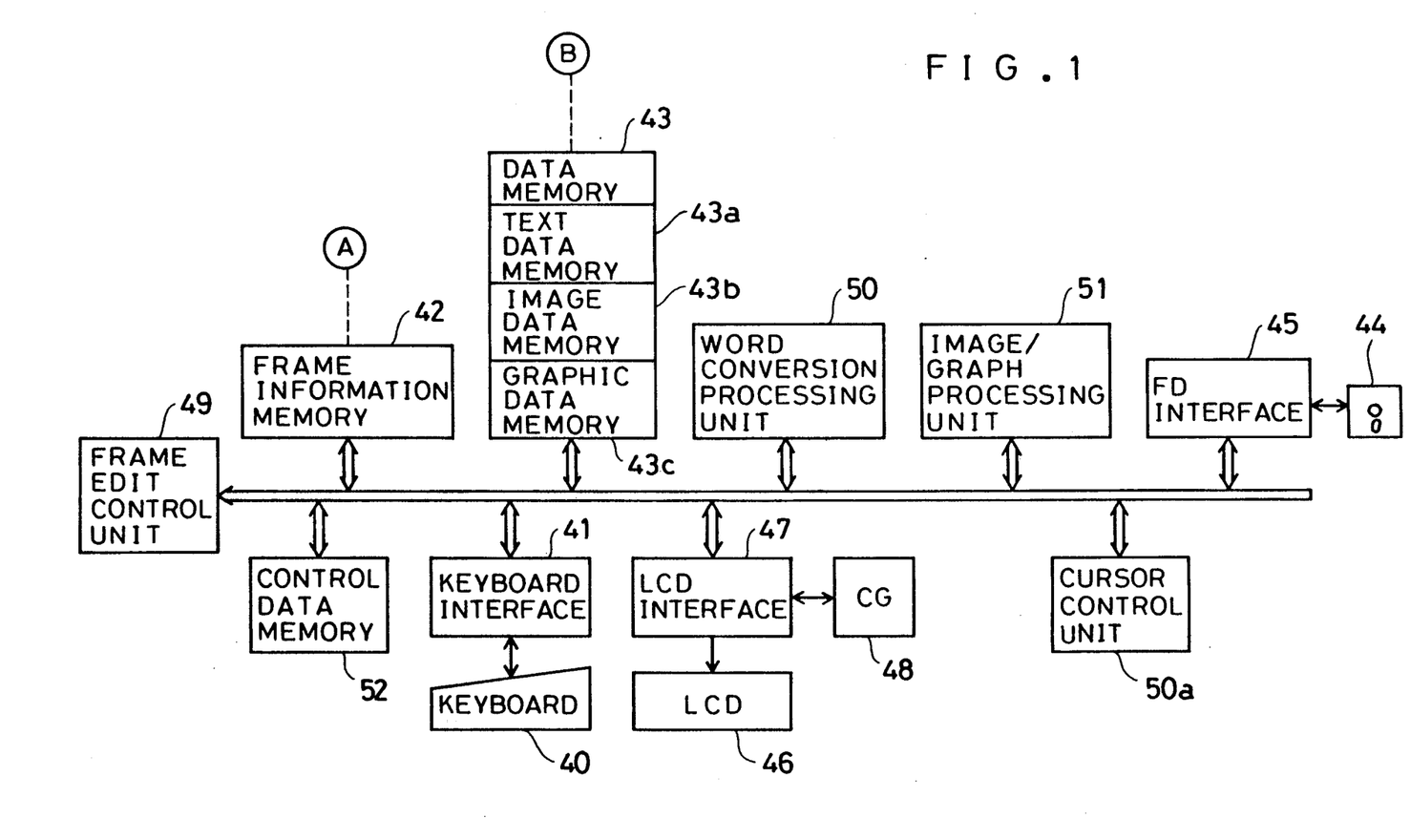
FIGS. 1 is a block diagram depicting a construction of the word processor.

Turning first to FIG. 1, designated at 40 is a keyboard serving as an input means equipped with alphabetic keys, numeral keys, function keys and instruction keys for inputting a variety of instructions. The keyboard inputs character strings, various and multiple instructions associated with frame editing, figure processing and graphic processing. Note that the input means is composed preferably of a keyboard but may consist of a pointing device such as a tablet unit or a mouse. The keyboard 40 is connected via a keyboard interface 41 to a processing unit and a control unit which will hereinafter be mentioned.

Figure 2:
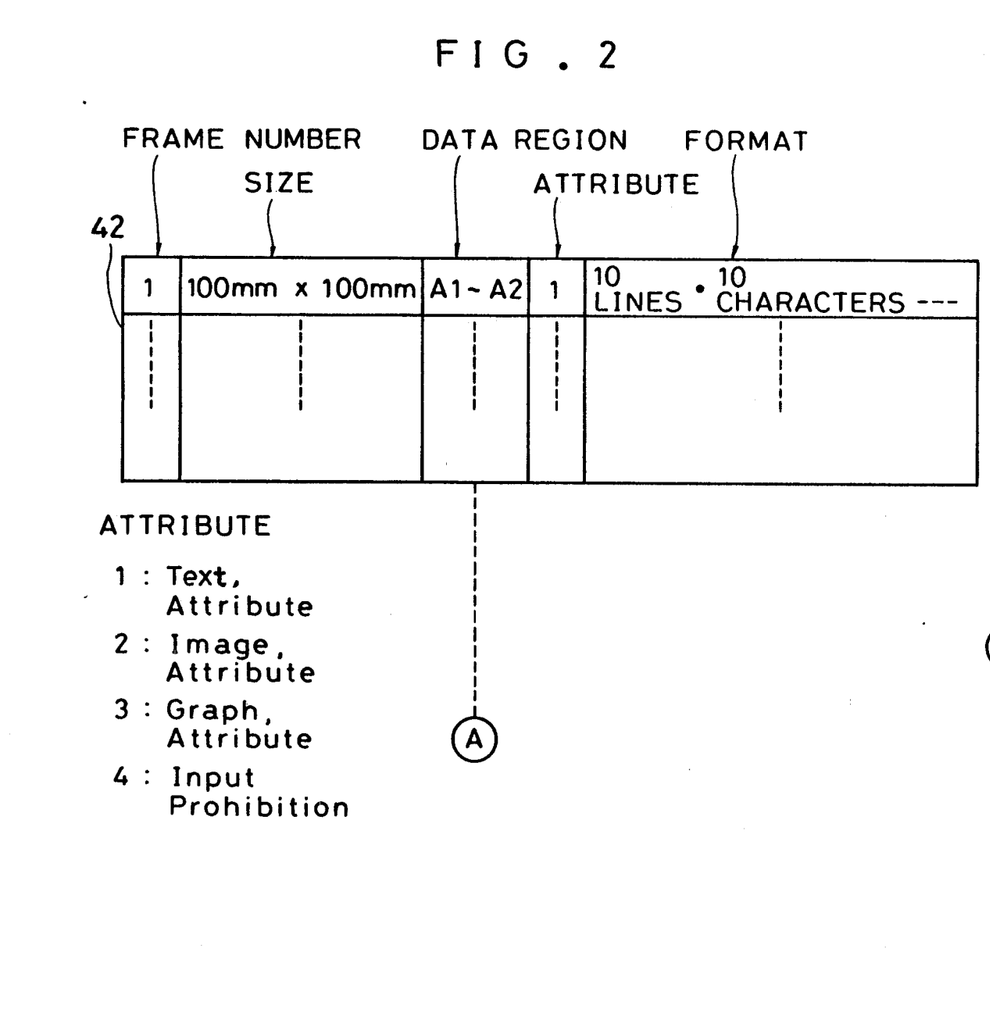
FIG. 2 is a diagram for assisting in explaining contents of a frame information memory depicted in FIG. 1.
Figure 3:
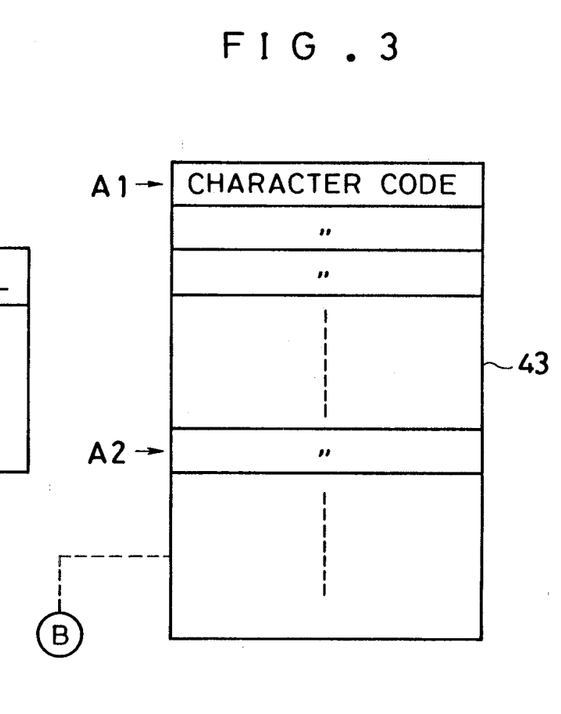
FIG. 3 is a diagram for assisting in explaining the contents of a data memory illustrated in FIG. 1.

Denoted at 42 is a frame information memory composed of a RAM, which incorporates text frame storage means and format storage means. The numerals 43 denote a data memory composed similarly of a RAM. Prestored in the frame information memory 42 are plural kinds of text frames each having a size corresponding to a paper size having predetermined fixed dimensions. For every text frame, the frame information memory 42 stores information related to its frame numbers, frame sizes, data regions, attributes and formats. With respect to the format information, text modes such as the number of characters entered in one line and a line feed pitch are stored by using modifiable set values (see FIG. 2). The data memory 43, which consists of a text data memory 43a, an image data memory 43b and a graphic data memory 43c, functions to store information on, e.g., character codes for every data region (see FIG. 3).

Designated at 44 is an external storage unit composed of a floppy disk in which multiple information is stored via a floppy disk interface 45. When creating text by converting character data inputted from, e.g., the keyboard 40 into words, the external storage unit 44 is employed to store the thus created text. The numeral 46 represents an LCD conceived as a display means, the LCD being capable of forming an input region and/or text frame display region on a single screen and is adapted to display a text frame and words converted on the basis of the character data inputted from the keyboard 40. An LCD interface 47 serves as the display control means, and acts to convert display signals into character or graphic images. The LCD interface 47 reads out, when effecting, for instance, a word-conversion, the characters from a character generator (CG) 48 and outputs them to the LCD 46. The LCD interface 47 simultaneously outputs the words read out by a word conversion processing unit (explained later) to the input region and also the text frame read out by a frame edit control unit (also explained later) to the text frame display region respectively in the LCD 46.

Note that the display means is not limited to the LCD 46 but may be constructed as a dot matrix type display unit such as an EL display.

The numeral 49 denotes for a frame edit control unit; 50 a word conversion processing unit; and 51 an image/graph processing unit. These control and processing units are composed of 16-bit microprocessors and execute a variety of processes in conformity with programs written to a control data memory 52 consisting of a ROM.

The frame edit control unit 49 incorporates text readout means, symbol converting means, symbol output means, dividing means, frame region selecting means, second cursor display means, input region identifying means, attribute setting means, allocating means, judging means, input destination specifying means, pattern storage means and pattern allocating means.

Based on this construction, the frame edit control unit 49 performs the following processes. To be specific, the text frame readout means reads out one text frame from the frame information memory 42 immediately upon receiving a text frame readout instruction from the keyboard 40.

The symbol converting means sequentially converts the words read out from the readout means (explained later) into symbols on a character by character basis. The symbols to be converted are preferably 1-dot inversion-displayed.

The symbol output means is intended to display the converted symbols in the text frame in conformity with a format stored in the frame information memory 42.

The dividing means works to divide the text frame into a plurality of frame regions.

The frame region selecting means selects one of the divided frame regions.

The second cursor display means displays a second cursor in the frame region, corresponding to the cursor in the input region.

The input region identifying means serves to identify and, by means of the display, to indicate the frame region within the text frame which corresponds to the input region.

The attribute setting means individually sets the attributes of each of the selected frame regions.

The allocating means allocates text data and image data inputted to the frame regions to a conversion processing unit or image/graph processing unit (which will be mentioned later with reference to the attributes stored in the frame information memory 42).

The judging means judges whether or not the words read out from a dictionary means (described later) exceed the number of input-allowable lines of the selected frame region.

The input destination specifying means specifies an input destination of the words read out in excess of the number of input-allowable line the judging means determines that the words exceed the number of input-allowable lines.

The pattern storage means stores various kinds of patterns corresponding to the kinds of attributes.

In setting the attributes of the individual frame regions, the pattern allocating means allocates the patterns corresponding to the attributes to the respective frame regions within the text frame after reading out these patterns from the pattern storage means for every frame region.

The word conversion processing unit 50, consisting of readout means and dictionary means, is adapted to convert the character data inputted from the keyboard 40 into words by retrieving words from the word dictionary unit (not illustrated here), and permits the text data memory 43a to store text composed of the thus converted words.

A cursor control unit generally designated as 50a serves as a cursor display means for displaying the cursor indicating its input position in the input region.

The image/graph processing unit 51 consisting of a figure processing means effects the processes relative to a figure input and a graphic input.

Figure 4:
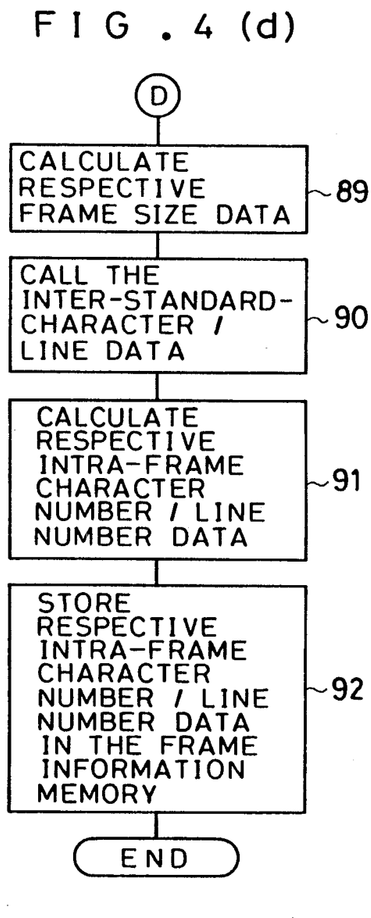
FIGS. 4(a)-4(d) are flow charts showing the steps for creating frames in the embodiment thereof.
Figure 4A:
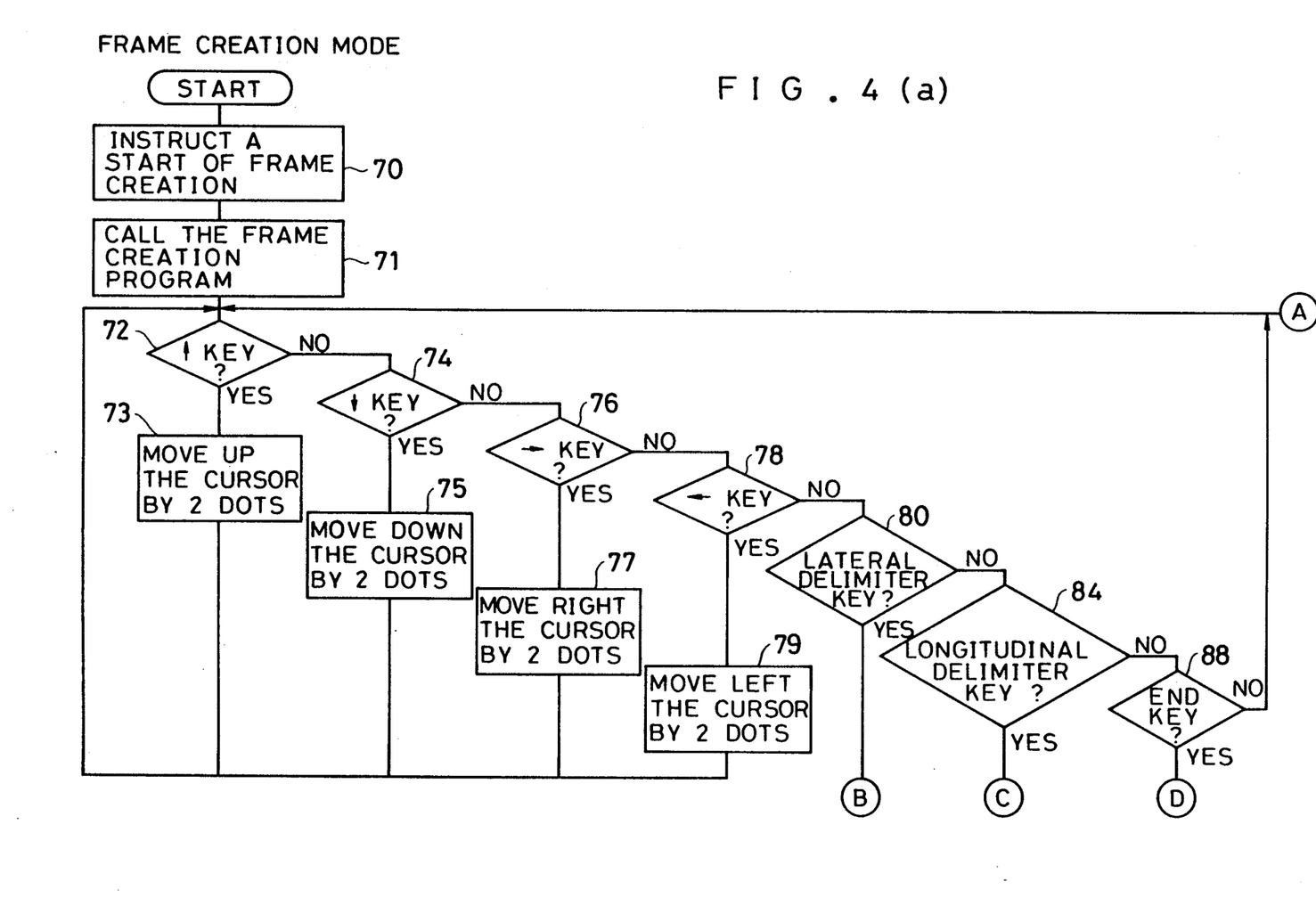

The description will now focus on the operation of this embodiment in conjunction with the flow charts of FIGS. 4, 6 and 8. It is to be noted that the explanation is made based on three distinct operations, namely a frame creation mode, a frame attribute mode and a frame input mode.

Frame Creation Mode

The frame creation mode is designed to allow for splitting of the text frame into a plurality of frame regions.

Referring to FIGS. 4(a)-4(d), when inputting an instruction from the keyboard 40 (step 70) which initiates frame creation, the frame edit control unit 49 calls a frame creation program from the control data memory 52 (step 71). Subsequently, one text frame A is read out from the frame information memory 42, and the text frame A is displayed on the LCD 46. When a [ ↑ ] key of cursor moving keys of the keyboard 40 is depressed (step 72), the cursor moves upward by 2 dots (step 73). When depressing the [ ↓ ] key (step 74), the cursor moves downward by 2 dots (step 75). When the [←] key is depressed (step 76), the cursor moves right by 2 dots (step 77). When the [←] key is depressed (step 78), the cursor moves left by 2 dots (step 79). Subsequent to the steps of moving the cursor, when depressing a lateral delimiter key (step 80), judgment is made as to whether or not a longitudinal delimiter is present in the horizontal direction (step 81). If the result is YES, a lateral delimiter line is inputted between the longitudinal delimiters (step 82), and the operation returns to step 72. Whereas if the result is NO in step 80, the task then becomes to judge whether or not a longitudinal key is needed (step 84). In the case of YES, it is required to judge whether or not the lateral delimiter exists in the vertical direction (step 85). If the result is YES, a longitudinal delimiter line is inputted between the lateral delimiters (step 86). Whereas if NO, the longitudinal delimiter line is inputted (step 87).

When depressing an "end" key (step 88) after the frame creation is complete, the frame edit control unit 49 calculates various size data of the individual fame regions (step 89), and subsequently inter-standard-character data and inter-standard-line data are called from the format stored in the frame information memory 42 (step 90). The data concerning, for example, the numbers of lines and characters which can be inputted to the respective frame regions are calculated (step 91). The same data which can be inputted thereto are stored in the frame information memory 42 for every frame (step 92).

Figure 5:
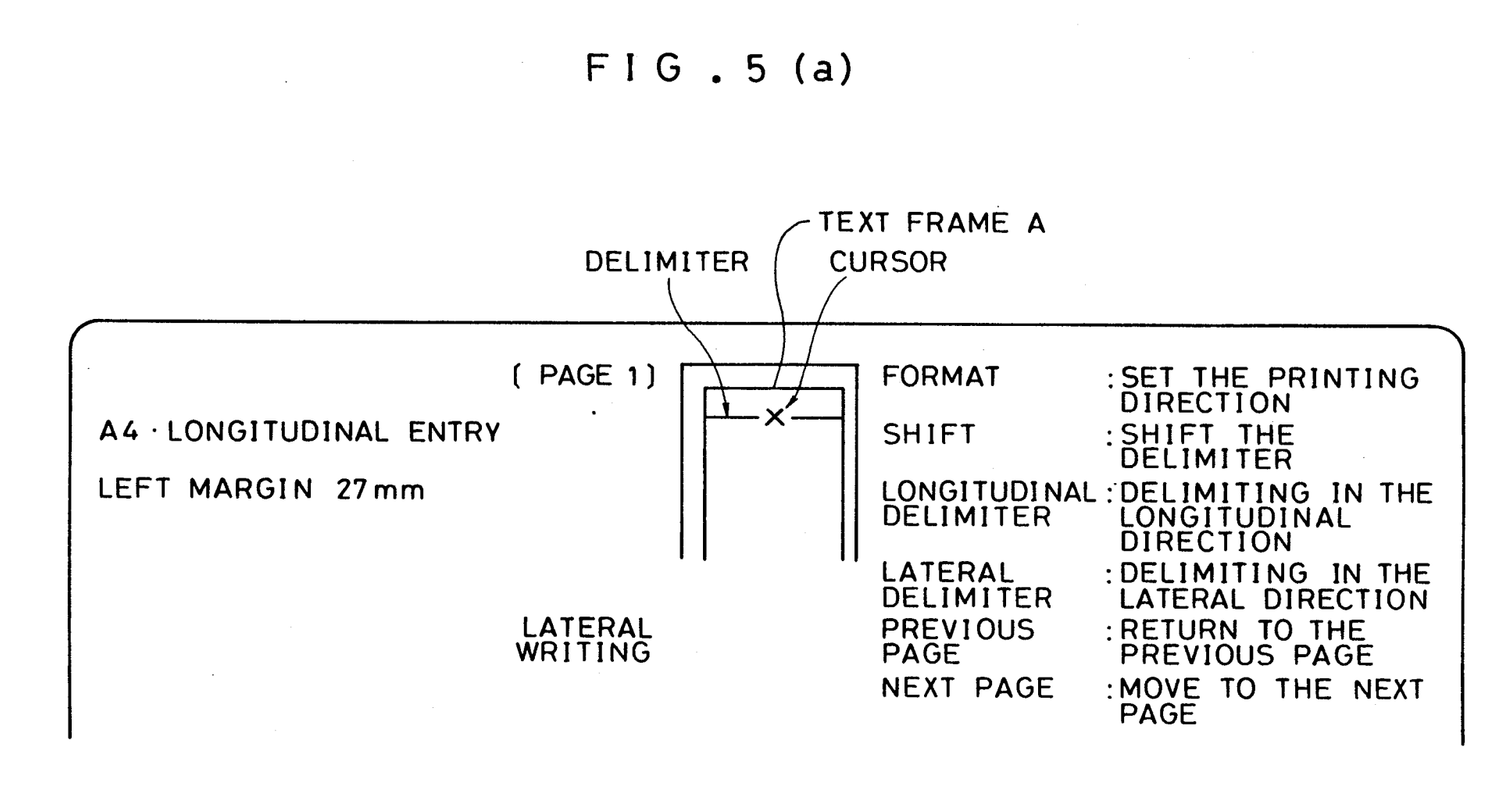
FIGS. 5(a)-5(c) are explanatory diagrams showing display pictures in the steps for creating the frames.
Figure 5B:
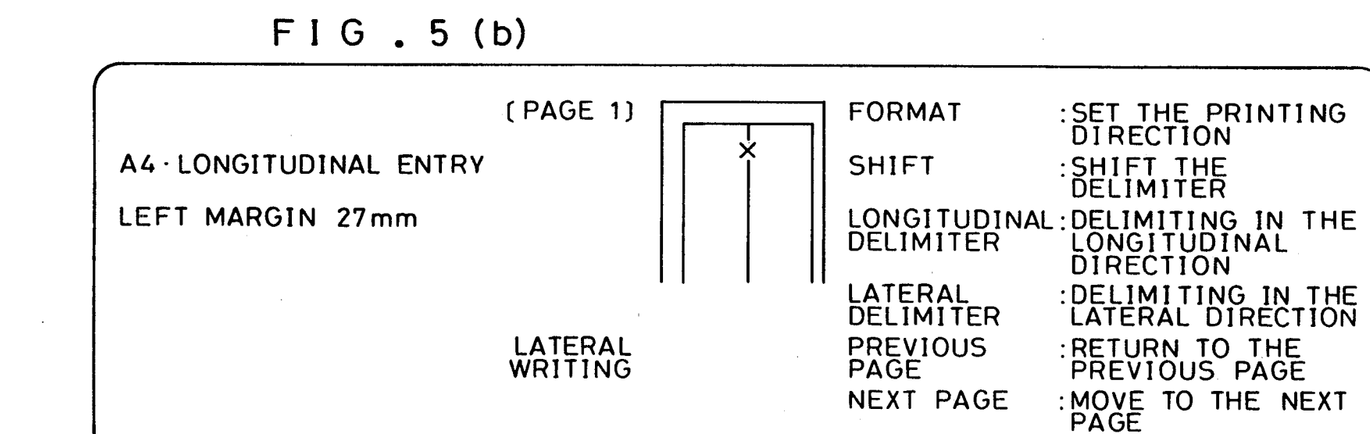
Figure 5C:
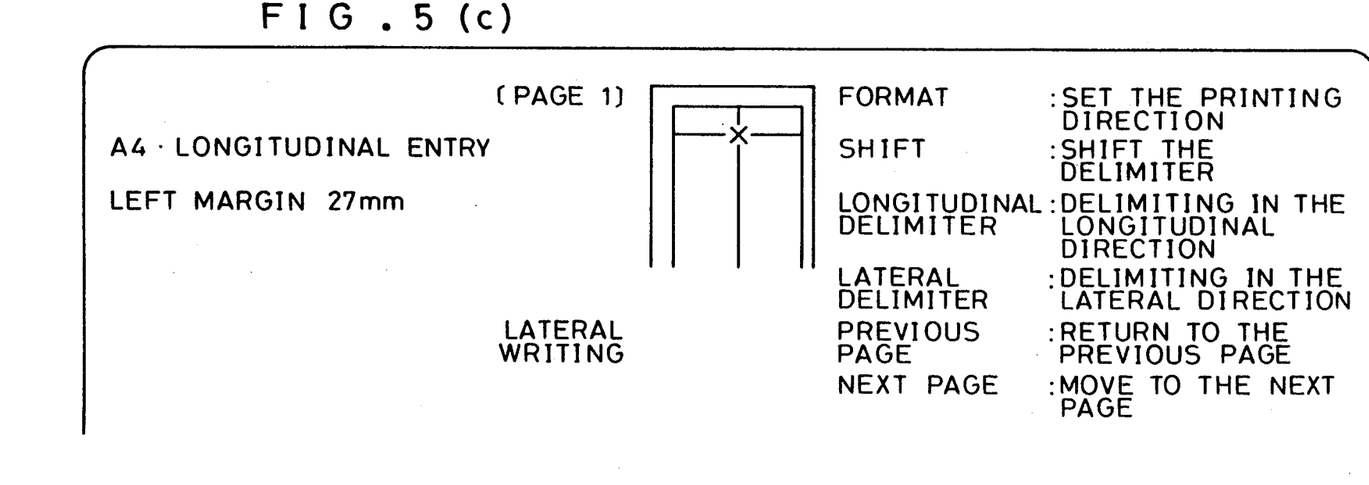

Turning to FIGS. 5(*a*)-5(*c*), there are shown display contents on the screen of the LCD 46, which are associated with the above-described processes. FIG. 5(*a*) shows conditions under which the lateral delimiter line is inputted. FIG. 5(*b*) shows conditions under which the longitudinal delimiter line is inputted. FIG. 5(*c*) shows condition under which the lateral and longitudinal delimiter lines are inputted.

Frame Attribute Setting Mode

The frame attribute setting mode is intended to set the attributes in the divided frame regions.

Figure 6A:
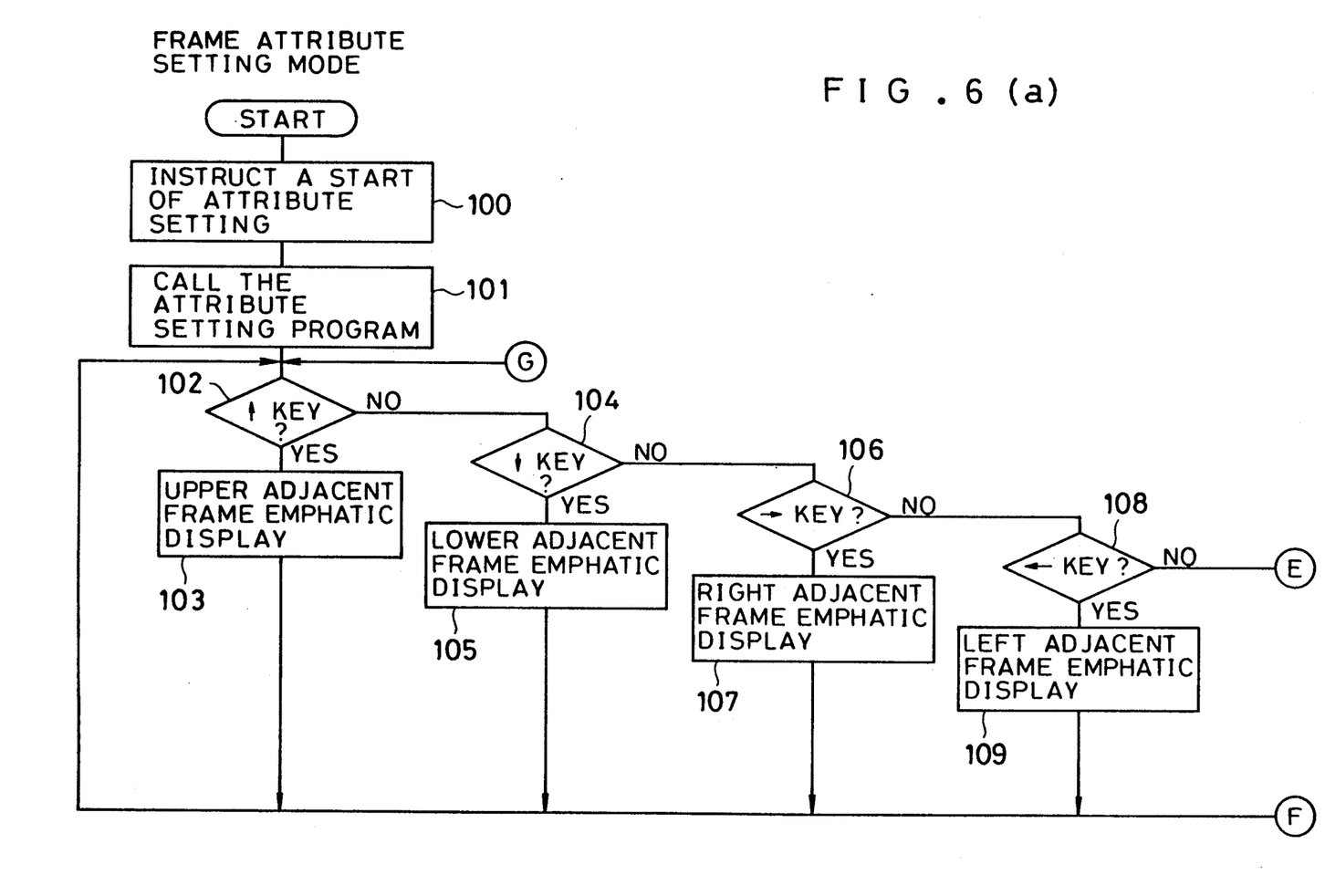
FIGS. 6(a)-6(b) are flow charts showing the steps for setting attributes in the embodiment thereof.
Figure 6B:
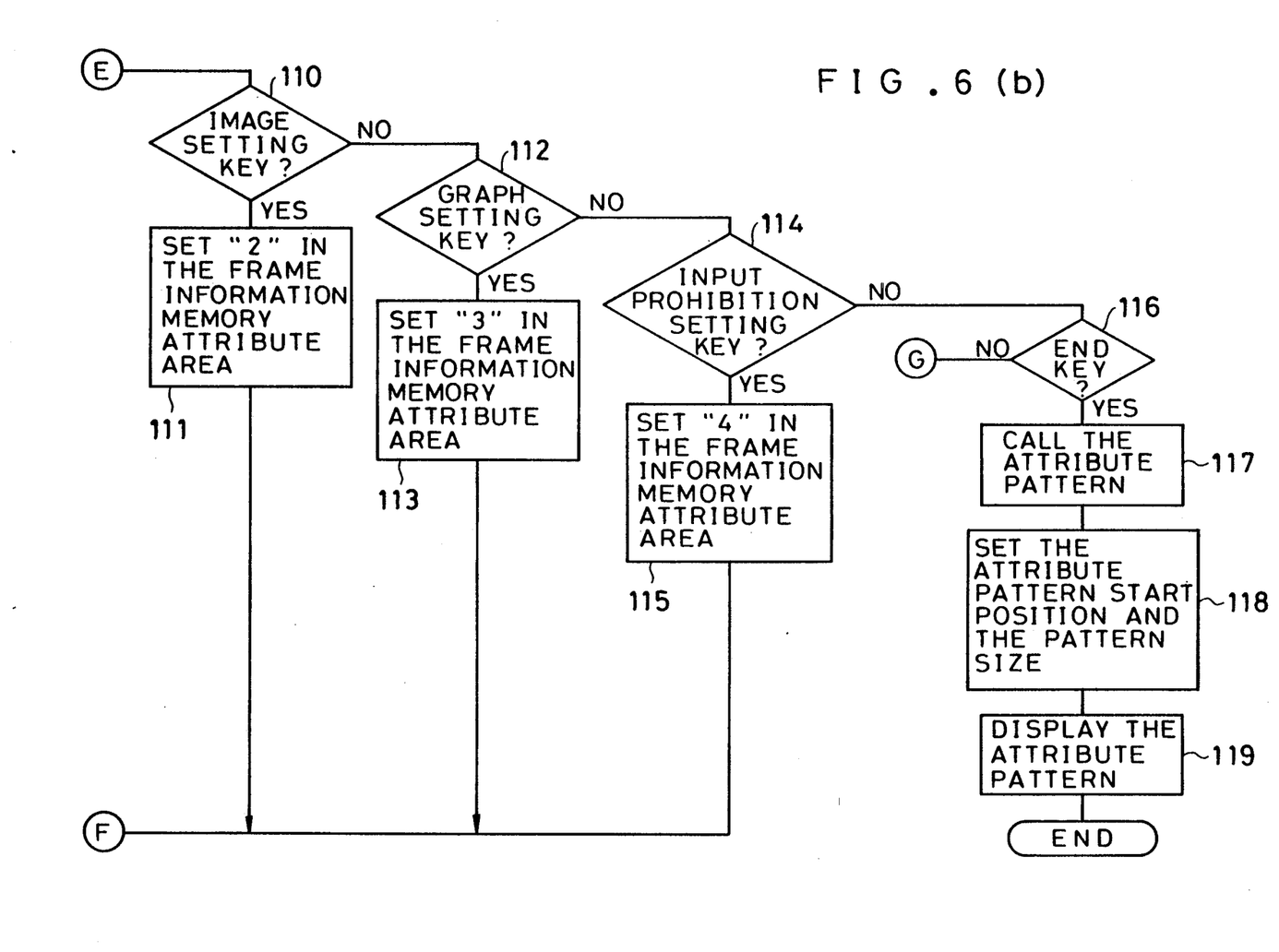

Referring to FIG. 6, when inputting an instruction from the keyboard 40 to initiate setting attributes (step 100), the frame edit control unit 49 calls an attribute setting program from the control data memory 52 (step 101). When depressing the [ ↑ ] key (step 102), the upper adjacent frame is emphatically displayed (step 103). In the case of depressing the [ ↓ ] key (step 104), a lower adjacent frame is emphatically displayed (step 105). When depressing the [→] key (step 106), a right adjacent frame is emphatically displayed (step 107). When the [←] key is depressed (step 108), a left adjacent frame is emphatically displayed (step 109). The specific frame regions are selected in the foregoing procedures, and thereafter there must be effected a judgment as to whether or not the image setting key is depressed (step 110). If the result of this judgment is YES, a code "2" indicating an image setting process is set in an attribute area of the frame information memory 42 (step 111). If the result is NO in the step 110, the task is to judge whether or not a graph setting key is depressed (step 112). If the answer is YES, a code "3" indicating a graph setting process is set in the attribute area of the frame information memory 42 (step 113). If the answer is NO at step 112, a judgment is made as to whether or not an input prohibition setting key has been depressed (step 114). If YES, a code "4" exhibiting an input prohibition setting process is set in the attribute area of the frame information memory 42 (step 115).

By depressing the "end" key after a variety of setting processes have been completed (step 116), the frame edit control unit 49 calls attribute patterns corresponding to the set attributes (step 117). Subsequently, an attribute pattern start position and a pattern size are set (step 118), and the attribute patterns are allocated to the respective frame regions within the text frame (step 119), thus completing the setting processes of the frame attributes. If the "end" key is not depressed in step 116, the operation returns to step 102. That is, the attributes are set in the next frame region.

Figure 7:
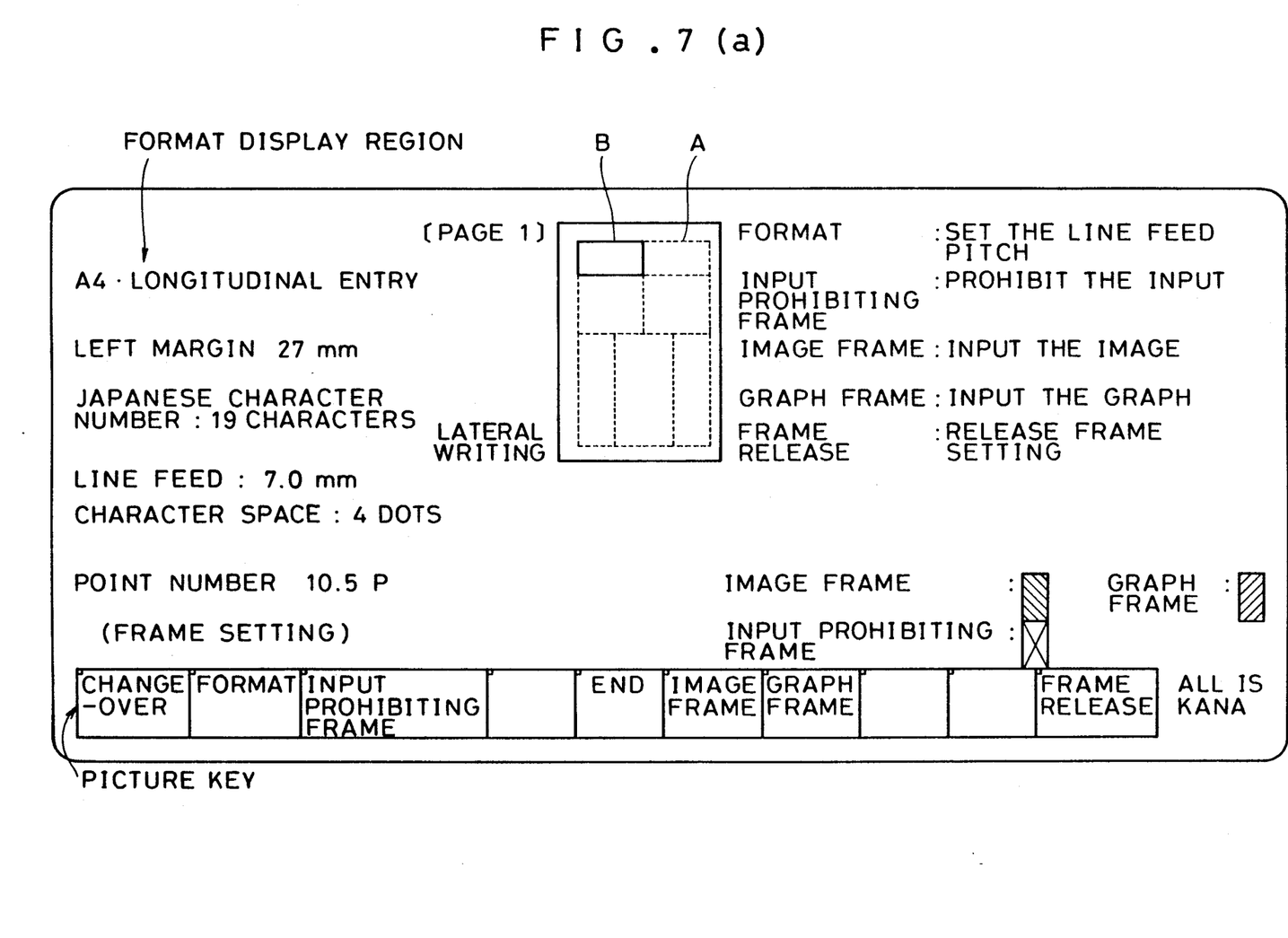
FIGS. 7(a) and 7(b) are explanatory diagrams showing the display pictures for the steps to set the attributes.

FIG. 7(*a*) illustrates an attribute setting screen, in which the symbol A represents a text frame drawn with a broken line, and B denotes a frame region, indicated by a solid line, for permitting attribute setting and a format change. The frame region B is created in the frame creation mode, wherein it is, as illustrated in FIG. 7(*a*), disposed in a position of a first frame (setting region B) as its initial state, and movements per frame can be performed by manipulating the cursor moving keys.

Figure 7B:
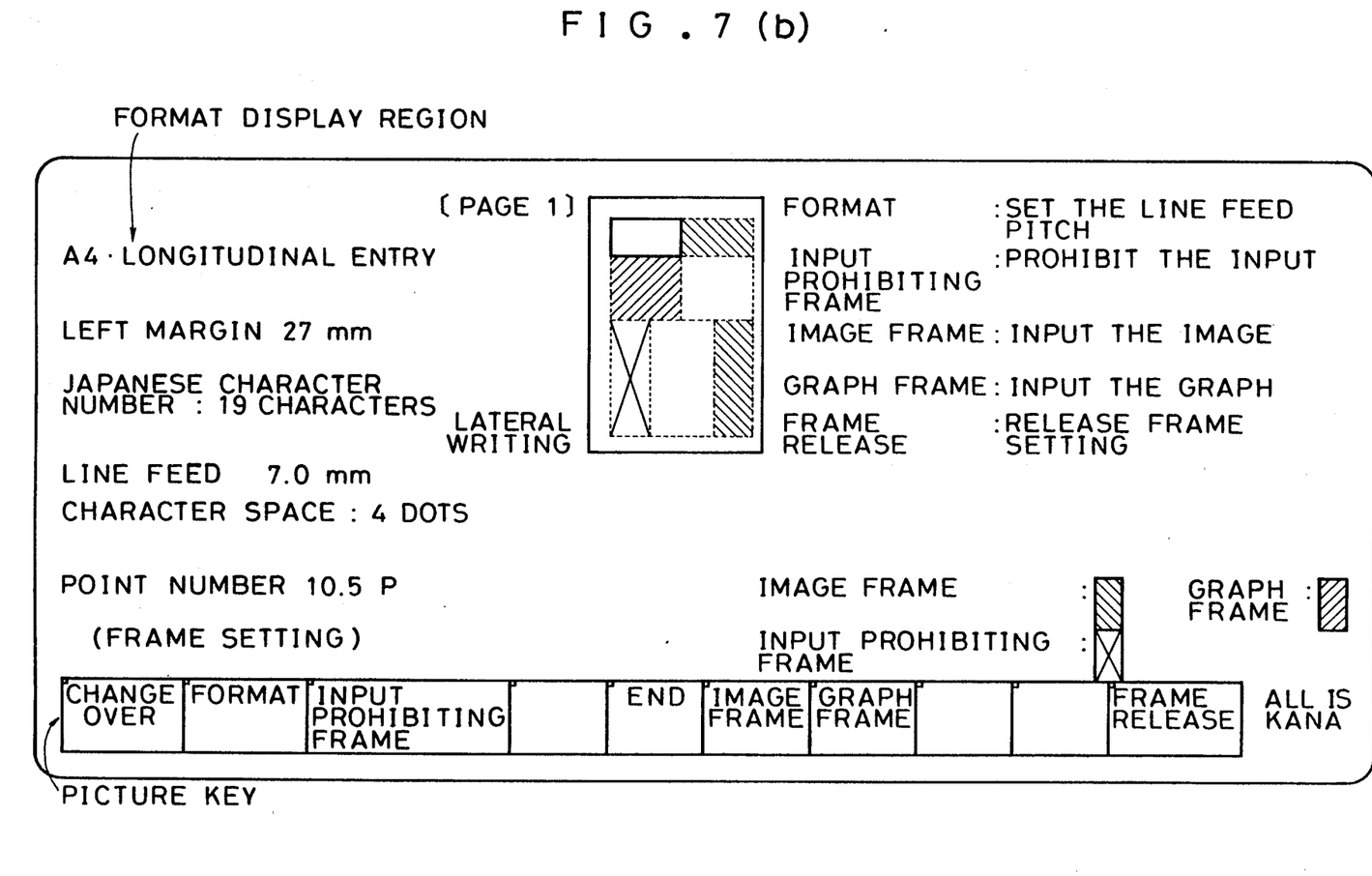

FIG. 7(*b*) depicts an attribute pattern display picture in which the plurality of divided frame regions are displayed with their different patterns, whereby the attributes of the respective frame regions can be identified at a glance.

Frame Input Mode

The frame input mode is designed for inputting the information, whether by characters, images or graphs, for every divided frame region.

Figure 8A:
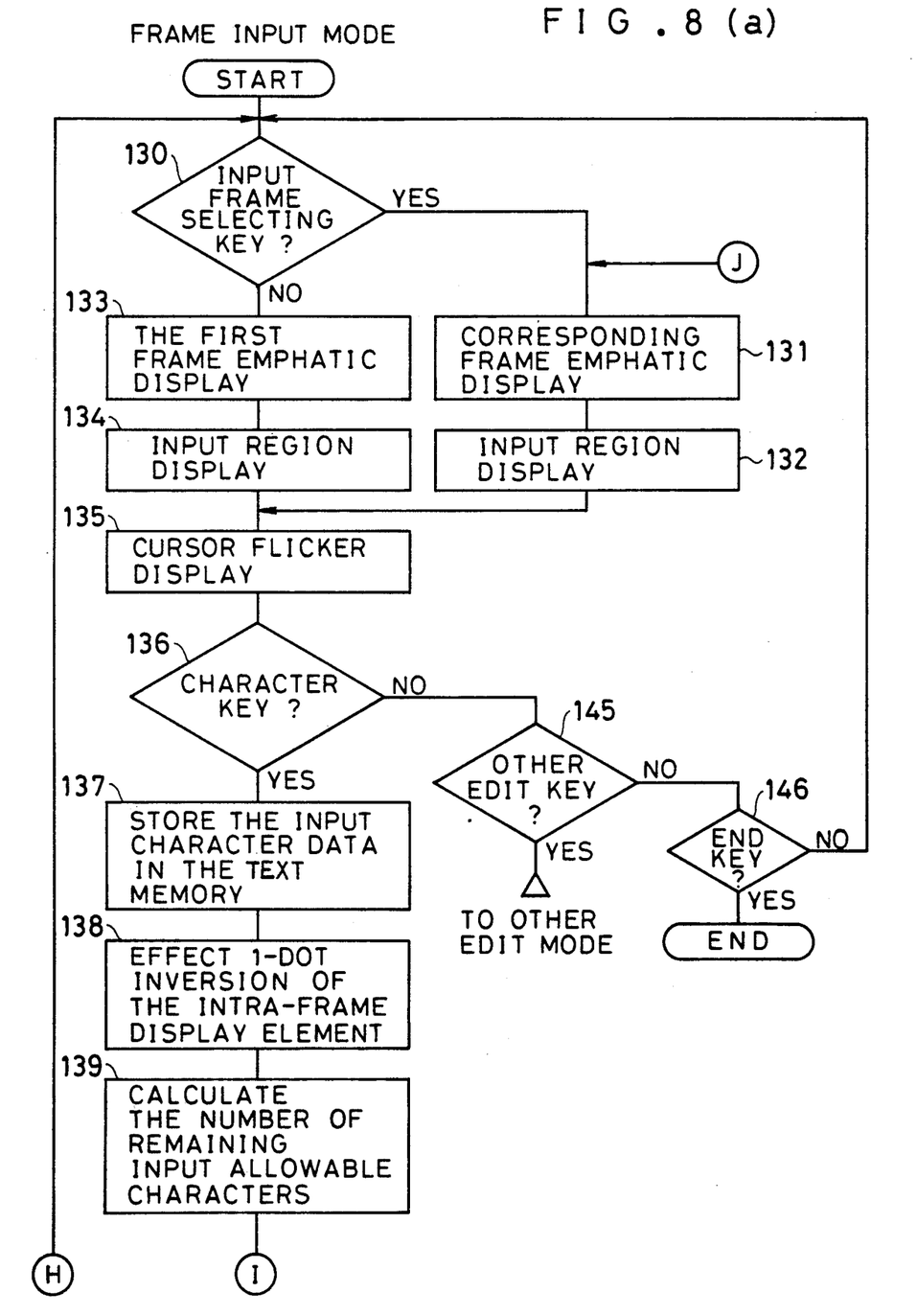
FIGS. 8(a) and 8(b) are flow charts showing the steps for inputting frames in the embodiment thereof.
Figure 8B:
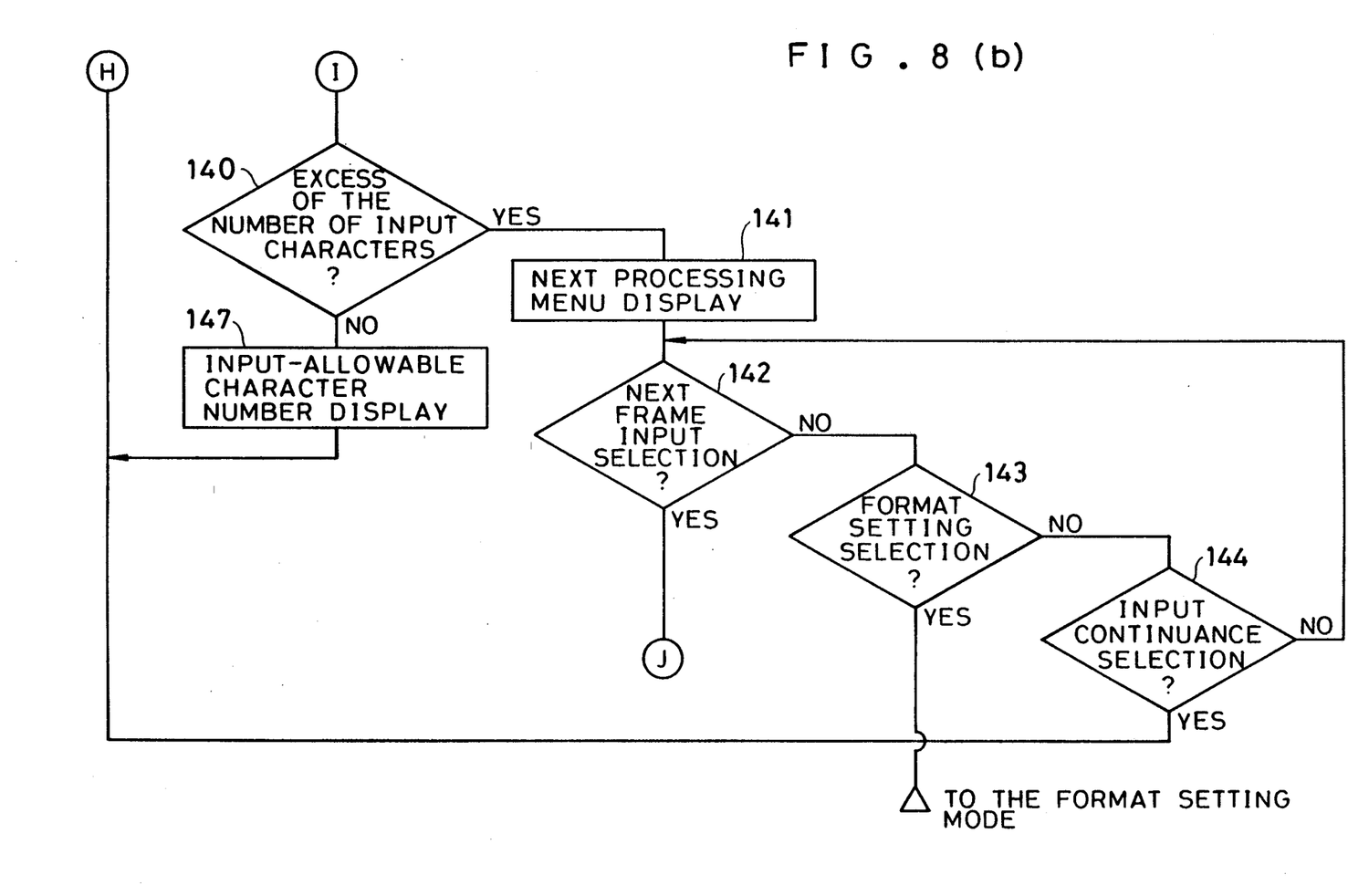
Figure 9:
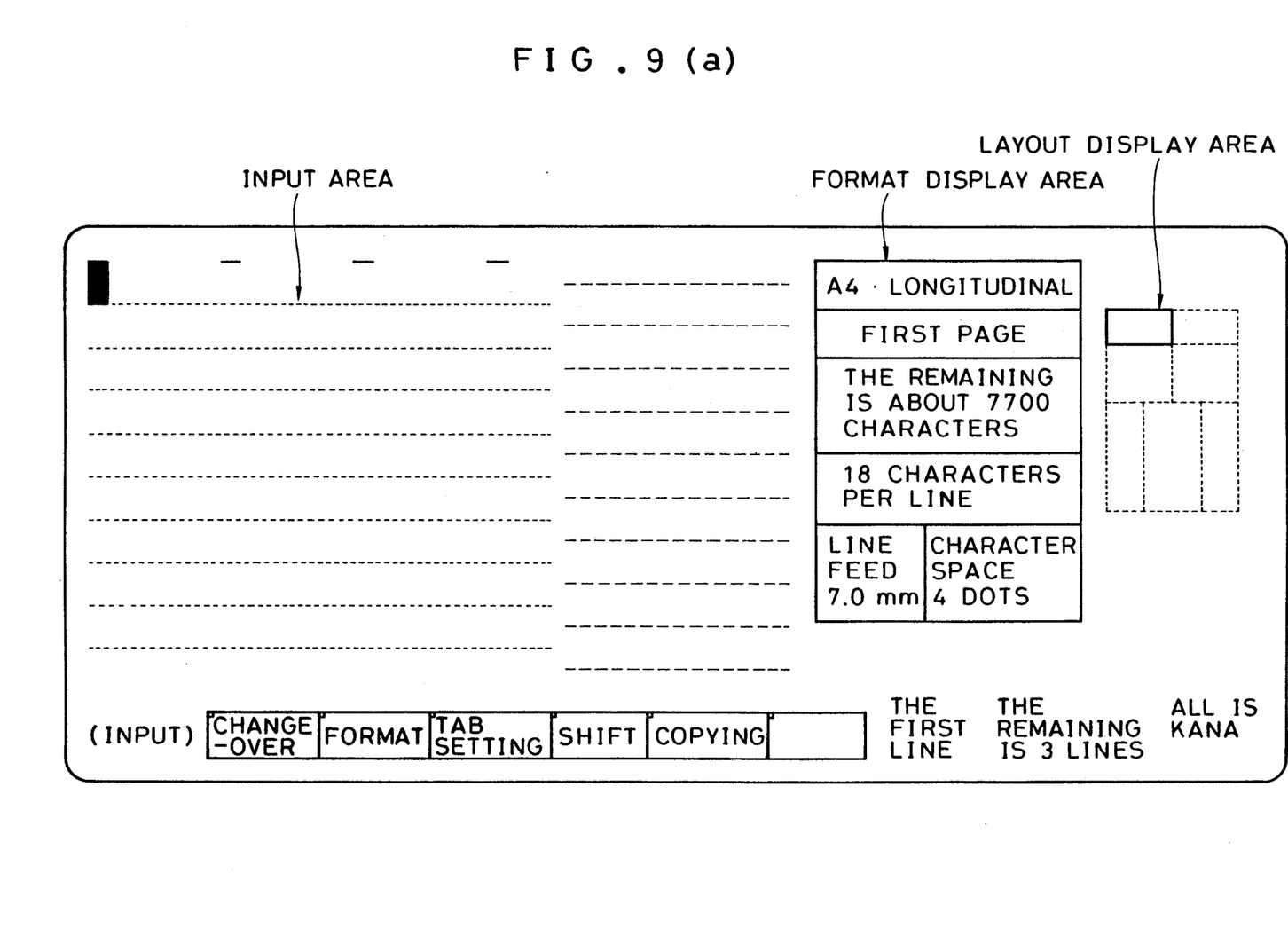
FIGS. 9(a) and 9(b) are explanatory diagrams illustrating display pictures in the steps of inputting the frames.

Turning to FIG. 8, the first step is to judge whether or not the frame selecting key of the keyboard 40 has been depressed (step 130). If YES, a frame (corresponding frame) of the selected frame region is emphatically displayed (step 131), and an input region is also displayed (step 132). When the input frame selecting key is not selected in the step 130, the first frame is emphatically displayed (step 133), and an input region of the first frame is then displayed (step 134). When the input region is displayed, a second cursor is displayed (flickering) in a corresponding position within the emphatically displayed frame (sentence frame) so that the second cursor corresponds to the position of the cursor in the input region (step 135). The next step is to judge whether or not a particular character key has been depressed (step 136). If YES, the words converted on the basis of the information which has been inputted and read are stored in the text data memory 43*a* (step 137), and a display element in the text frame is 1-dot inversion-displayed with respect to one character of the converted word (step 138). Subsequent to this step, the number of remaining characters which can be inputted is calculated (step 139). Then a judgment is made as to whether or not the number of inputted characters will exceed the frame capacity (step 140). If the number of remaining characters is greater than the capacity, a subsequent processing menu shown in FIG. 9(*b*) is displayed (step 141). Then judgment is executed as to whether or not an input destination of the next frame is to be selected (step 142). When the next frame is selected, the operation moves back to step 131. That is, the excessive characters can be inputted to the next selected frame region.

If NO in step 142, where the excessive characters are to be inputted to the present frame region, for instance, so that the next frame region is not selected and shortening of an inter-line distance is executed, there must be executed a judgment about whether or not the format setting is selected (step 143). In the case of YES, the program moves to a format setting mode in which inter-line and inter-character modifications can be effected. If NO in step 143, it is necessary to judge whether or not the input continues (step 144). When the result is YES, the operation returns to step 130. Whereas if NO, it reverts to step 142.

In case the character key is not inputted in the step 136, it is necessary to determine whether or not other edit keys have been depressed (step 145). If YES, the program moves to another edit mode. Whereas if NO, there must a judgment made about whether or not the end key has been depressed (step 146). When the result is YES, the process is terminated. If NO, the operation goes back to the step 130.

If NO in step 140, i.e., when the number of inputted characters does not exceed the capacity, the number of remaining characters that can be inputted is displayed on the lower part of the screen of the LCD 46 (step 147).

FIG. 9(a) shows a frame input screen, wherein an input region, a format and a layout of a divided text frame are respectively displayed.

FIG. 9(b) illustrates a screen of the next processing menu displayed when text is inputted and exceeds one frame. The next processing menu includes the following elements: (1) a shift to the next frame, (2) format setting, and (3) continuance of input. In accordance with this menu, if the volume of text exceeds one frame region, the operator is allowed to select the next input destination.

Although only one embodiment of the invention has been disclosed and described, it is apparent that other embodiments and modifications of the invention may be effected by one skilled in the art without departing from the scope or spirit of the invention. The same effects as those in the present invention can be obtained if the word processor is designed for, e.g., European languages or Japanese, or includes a computer having the text editing function.

What is claimed is:

1. A word processor with a text layout display function, comprising:
   input means for entering character string text data and for inputting instructions to readout a text frame;
   text frame storage means for storing a plurality of text frame types;
   format storage means for storing a text format for display within a text frame;
   text frame readout means for reading out from the text frame storage means, in response to an instruction from the input means, a single text frame;
   displaying means including a screen for concurrently displaying on the screen an input region within which text data entered from said input means is displayable as the text data is entered from said input means and a text frame display region within which the text data entered from said input means is displayable, as the text data is entered from said input means, in a layout format defined by the text format stored in said format storage means;
   display control means for concurrently displaying test data entered from said input means in said input region and the text frame read out from said text frame storage means in said text frame display region;
   first cursor display means for displaying a first position-identifying cursor within the input region at a location at which text data is entered from said input means;
   output means for displaying, in said text frame display region, the text data in said input region in a layout format defined by the text format stored in said format storage means, and for concurrently displaying in the text frame display region of the display means screen, as new character string text data is entered from said input means and is displayed in the input region of the display means screen, the new text data in a layout format defined by the text format stored in said format storage means;
   dividing means for dividing the text frame into a plurality of concurrently displayed frame regions;
   frame region selecting means for selecting any one of the plural frame regions for receiving new text data entered from said input means in layout format;
   second cursor display means for displaying, concurrently with the display of said first cursor in the input region, a second cursor within said selected frame region at a location relative to the layout formatted text data displayed in said selected frame region that corresponds to the location of the first cursor in the input region relative to the text data concurrently displayed in said input region; and
   input region identifying means for identifying and displaying in the selected frame region, in layout format, the new text data concurrently entered and displayed in the input region.

2. The word processor as claimed in claim 1, further comprising: attribute setting means for setting attributes of the selected frame region; attribute storage means for storing the attributes set by the attribute setting means; image input means for entering image data; and allocating means for assigning for display, in accordance with the attributes stored in said attribute storage means, text data to a frame region with respect to which text data attributes have been set by said attribute setting means and image data to a frame region with respect to which image data attributes have been set by said attribute setting means.

3. The word processor as claimed in claim 2, further comprising: pattern storage means for storing a plurality of different patterns, each said pattern denoting a particular attribute type; and pattern allocating means for assigning to each said frame region for which an attribute has been set by said attribute setting means, and for causing to be displayed in the frame region, the pattern that denotes the particular attribute set for that frame region.

4. The word processor as claimed in claim 1, the selected frame region being capable of receiving a predetermined number of lines of text data, said word processor further comprising judging means for determining whether the text data entered from said input means, when displayed in the selected frame region in said layout format, exceeds said predetermined number of lines; and input destination specifying means for specifying an input destination for text data entered from said input means and which exceeds, when displayed in the selected frame region, said predetermined number of lines.

* * * * *